United States Patent [19]

Pigerol et al.

[11] 4,096,112
[45] Jun. 20, 1978

[54] 2-PHENYL-INDOLE DERIVATIVE STABILIZERS FOR PVC RESINS

[75] Inventors: Charles Pigerol, Saint-Ouen; Marie-Madeleine Chandavoine; Paul de Cointet de Fillain, both of Sisteron; Souli Nanthavong, Grenoble, all of France

[73] Assignee: Labaz, France

[21] Appl. No.: 755,335

[22] Filed: Dec. 29, 1976

Related U.S. Application Data

[63] Continuation of Ser. No. 580,092, May 30, 1975, Pat. No. 4,024,155.

[51] Int. Cl.² ............................................... C08K 5/35
[52] U.S. Cl. ............................................... 260/45.8 N
[58] Field of Search ........... 260/326.16, 319.1, 45.8 N

[56] References Cited

U.S. PATENT DOCUMENTS 3,781,279  12/1973  Crounse et al. ................... 260/319.1
3,888,818  6/1975   Deblandre et al. ............. 260/45.8 N
4,024,155  5/1977   Pigerol et al. ................. 260/45.8 N

OTHER PUBLICATIONS

CA vol. 59 (1963) p. 11434c – Szmuszkovicz.
CA vol. 49 (1955) p. 9001i – Woodard et al.
CA vol. 54, pp. 9883–9884 (1960) – Bruce.

Primary Examiner—V.P. Hoke
Attorney, Agent, or Firm—Mason, Kolehmainen, Rathburn & Wyss

[57] ABSTRACT

New stabilizers for polymers of vinyl chloride, the said stabilizers being 2-phenyl-indole derivatives corresponding to the formula:

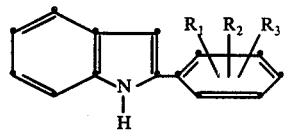

wherein $R_1$ and $R_2$, which are the same or different, each represent a branched- or straight-chain alkyl group containing from 1 to 12 carbon atoms, a cyclohexyl radical, a branched- or straight-chain alkyloxy group containing from 1 to 12 carbon atoms, a benzyloxy radical, a hydroxy radical or $R_1$ and $R_2$ represent together an alkylenedioxy radical containing from 1 to 3 carbon atoms, $R_3$ represents a hydrogen atom, a methyl or methoxy radical, with the proviso that one at least of the substituents $R_1$ or $R_2$ does not represent an alkyl radical.

3 Claims, No Drawings

2-PHENYL-INDOLE DERIVATIVE STABILIZERS FOR PVC RESINS

This application is a continuation of our application Ser. No. 582,092 filed May 30, 1975, now U.S. Pat. No. 4,024,155 granted May 17, 1977.

The present invention relates to 2-phenyl-indole derivatives and to processes for preparing the said 2-phenyl-indole derivatives.

The 2-phenyl-indole derivatives with which the present invention is concerned are the substances represented by the formula:

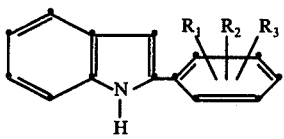  I wherein $R_1$ and $R_2$, which are the same or different, each represent a branched or straight-chain alkyl group containing from 1 to 12 carbon atoms, a cyclohexyl radical, a branched- or straight-chain alkyloxy group containing from 1 to 12 carbon atoms, a benzyloxy radical, a hydroxy radical or $R_1$ and $R_2$ represent together an alkylenedioxy radical containing from 1 to 3 carbon atoms, $R_3$ represents a hydrogen atom, a methyl or methoxy radical, with the proviso that one at least of the substituents $R_1$ or $R_2$ does not represent an alkyl radical.

The substances of formula I can be prepared, according to the Fischer Indole Synthesis, by reacting a substituted acetophenone derivative, represented by the formula:

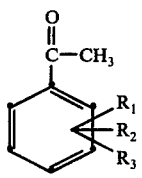  II in which $R_1$, $R_2$ and $R_3$ have the same meanings as in formula I, with phenylhydrazine to form a substituted acetophenone phenylhydrazone, represented by the formula:

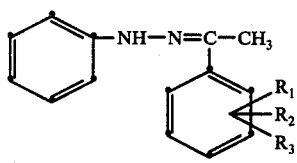  III in which $R_1$, $R_2$ and $R_3$ have the same meanings as in formula I and cyclising the substances of formula III either with a dehydrating agent such as, for example, sulfuric acid, polyphosphoric acid or zinc chloride, or by thermolysis, to form the required 2-phenyl-indole derivative of formula I.

The substances of formula I may alternatively be prepared, according to the Bischler Indole Synthesis, by reacting a substituted acetophenone derivative, represented by the formula:

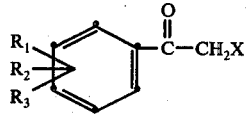  IV in which $R_1$, $R_2$ and $R_3$ have the same meanings as in formula I and X represents a halogen atom, preferably bromine or chlorine, with aniline to form the required 2-phenyl-indole derivative of formula I.

The substances of formula I, wherein one at least of the substituents $R_1$, $R_2$ and $R_3$ represents a branched- or straight-chain alkyloxy group containing from 1 to 12 carbon atoms, may alternatively be prepared by reacting the corresponding hydroxylated 2-phenyl-indole derivative, the said hydroxylated derivative having been prepared by one of the two general methods described above, with a branched- or straight-chain alkyl halide containing from 1 to 12 carbon atoms, in the presence of sodium methylate and, optionally, of N,N-dimethylformamide.

The substances of formula I, wherein one at least of the substituents $R_1$ and $R_2$ represents a hydroxy radical, may alternatively be prepared by demethylating the corresponding methoxy-substituted 2-phenyl-indole derivative, the said derivative having been prepared by one of the two general methods described above, by means of aluminium chloride or pyridine hydrochloride, optionally in the presence of benzene.

The substances of formula II are already known or may be prepared by known procedures.

The substances of formula IV are either known or may be prepared by reacting the appropriate substance of formula II with a halogen, preferably bromine or chlorine.

The 2-phenyl-indole derivatives according to the invention have been found to be good stabilizers of polymers of vinyl chloride such as, for example, polyvinyl chloride, polyvinyl chloride - polyvinyl acetate, polyvinyl chloride - polyvinylidene chloride.

They have been found to be particularly valuable as stabilizers of the homo polymers and co-polymers intended to be formed by extrusion-moulding, blow-moulding and calendering, mainly but not solely with a view to manufacturing containers for food and drink, such as, for example, bottles for wine, oil, vinegar and mineral water.

The substances of the invention which are listed hereunder are new and are claimed as such:
2-(2',4'-dihydroxy-phenyl)-indole (Stabilizer 1)
2-(3'-methoxy-4'-hydroxy-phenyl)-indole (Stabilizer 2)
2-(3',5'-dimethyoxy-phenyl)-indole (Stabilizer 3)
2-(2'-hydroxy-4'-methoxy-phenyl)-indole (Stabilizer 4)
2-(2'-hydroxy-4'-methyl-phenyl)-indole (Stabilizer 5)
2-(2'-methyl-4'-hydroxy-phenyl)-indole (Stabilizer 6)
2-(2'-methoxy-4'-methyl-phenyl)-indole (Stabilizer 7)
2-(3'-methyl-4'-methoxy-phenyl)-indole (Stabilizer 8)
2-(2',4'-dimethoxy-phenyl)-indole (Stabilizer 9)
2-(2'-methyl-4'-methoxy-phenyl)-indole (Stabilizer 10)
2-(2'-methoxy-5'-methyl-phenyl)-indole (Stabilizer 11)
2-(3'-methyl-4'-hydroxy-phenyl)-indole (Stabilizer 12)
2-(3'-hydroxy-4'-methoxy-phenyl)-indole (Stabilizer 13)
2-(3'-dodecyl-4'-methoxy-phenyl)-indole (Stabilizer 14)
2-(3'-isopropyl-4'-methoxy-phenyl)-indole (Stabilizer 15)
2-(3'-cyclohexyl-4'-methoxy-phenyl)-indole (Stabilizer 16)

2-(3',5'-dimethyl-4'-methoxy-phenyl)-indole (Stabilizer 17)
2-(3',5'-dimethyl-4'-ethoxy-phenyl)-indole (Stabilizer 18)
2-(3'-dodecyl-4'-hydroxy-phenyl)-indole (Stabilizer 19)
2-(3'-isopropyl-4'-hydroxy-phenyl)-indole (Stabilizer 20)
2-(3'-cyclohexyl-4'-hydroxy-phenyl)-indole (Stabilizer 21)
2-(3',5'-dimethyl-4'-hydroxy-phenyl)-indole (Stabilizer 22)
2-(3'-methoxy-4'-ethoxy-phenyl)-indole (Stabilizer 23)
2-(3'-methoxy-4'-dodecyloxy-phenyl)-indole (Stabilizer 24)
2-(3'-methoxy-4'-butyloxy-phenyl)-indole (Stabilizer 25)
2-(3'-methoxy-4'-propyloxy-phenyl)-indole (Stabilizer 26)
2-(3'-methoxy-4'-isopropyloxy-phenyl)-indole (Stabilizer 27)
2-(3'4'-diethoxy-phenyl)-indole (Stabilizer 28)
2-(3'-benzyloxy-4'-methoxy-phenyl)indole (Stabilizer 29)
2-(3'-methyl-4'-dodecyloxy-phenyl)-indole (Stabilizer 30)
2-(3'-methoxy-4'-benzyloxy-phenyl)-indole (Stabilizer 31)
2-(3'-methyl-4'-benzyloxy-phenyl)-indole (Stabilizer 32)
2-(3',4'-methylenedioxy-phenyl)-indole (Stabilizer 33)
2-(3',4'-ethylenedioxy-phenyl)-indole (Stabilizer 34)
2-(3'-methyl-4'-ethoxy-phenyl)-indole (Stabilizer 35)

As against this, the substances listed hereunder are already known but are considered as new stabilizers of polymers and co-polymers of vinyl chloride:
2-(3',4'-dimethoxy-phenyl)-indole (Stabilizer 36)
2-(3',4',5'-trimethoxy-phenyl)-indole (Stabilizer 37)
2-(2'-hydroxy-5'-methyl-phenyl)-indole (Stabilizer 38)

Vinyl resins are known to deteriorate under the influence of heat and it is necessary to add a stabilizing agent to these masses of synthetic materials in order to retard thermodegradation and thus delay coloration of the resin.

Amongst the organic stabilizers used up-to-present, 2-phenyl-indole is one of the most valuable, owing to its good stabilizing power and its low toxicity. It is, moreover, widely used in the plastics industry to stabilize vinyl polymers and co-polymers, especially those which are to be used for containing food and drink.

However, good stabilizing power, though necessary, is not the only quality required for a stabilizer. The following characteristics also have great importance:
- thermostability of the stabilized resin
- sticking of the stabilized resin
- behaviour on extrusion of the stabilized resin
- behaviour on blowing of the stabilized resin
- sublimation of the stabilizer
- thermostability of the stabilizer Finally, as far as containers for food and drink are concerned, extractibility of the stabilizers by the food or drink in the container must be carefully evaluated.

For one or more of the above characteristics, the stabilizers of the invention have been found to be superior to 2-phenyl-indole, while the preferred stabilizer, namely 2-(3'-methoxy-4'-hydroxy-phenyl)-indole, has shown itself to be superior to 2-phenyl-indole from every point of view.

The toxicity of the stabilizers of the invention was studied first and the satisfactory results obtained were such as to justify continuation of the investigation.

A. Acute toxicity.

The acute toxicity ($LD_{50}$) of the stabilizers listed below was carried out, by determining the dose of substance which provoked the death of 50% of the treated animals.

A gummy suspension of the substance under study was administered by oral route to groups of at least ten mice and the following results were observed:

| Stabilizers | $LD_{50}$ (mg/kg) | Toxic symptons |
|---|---|---|
| 2 | >2000 | none |
| 3 | >2000 | none |
| 14 | >3000 | none |
| 15 | >3000 | none |
| 2-phenyl-indole | >3000 | none |

The maximal dose which does not provoke any death ($LD_O$) was also determined for the stabilizers listed hereunder, using the same method.

The following results were observed:

| Stabilizers | $LD_0$ (mg/kg) | Toxic symptons |
|---|---|---|
| 17 | >3000 | none |
| 23 | > 500 | none |
| 25 | >3000 | none |
| 27 | >3000 | none |
| 29 | > 500 | none |
| 31 | > 500 | none |
| 33 | >3000 | none |
| 34 | >3000 | none |
| 39 | > 500 | none |

B. Thermostability of the stabilized resin.

The stabilizing power of the substances of the invention was studied from two points of view:
(a) Static thermostability
(b) Dynamic thermostability These studies were performed with five different formulae of vinyl resins (hereinafter referred to as Compounds).

| Compound A | |
|---|---|
| Ingredients | Parts by weight |
| Polyvinyl chloride resin | 100 |
| Anti-shock resin | 9 |
| Epoxide soja bean oil | 2 |
| Calcium-12-hydroxy-stearate | 0.2 |
| SL 2016 | 0.1 |
| Stabilizer | 0.3 |

| Compound B | |
|---|---|
| Ingredients | Parts by weight |
| Polyvinyl chloride resin | 100 |
| Anti-shock resin | 9 |
| Epoxide soja bean oil | 2 |
| Chelating agent 1832 | 0.25 |
| Solution of 2-ethyl-potassium-hexanoate containing 10% of potassium | 0.025 |
| Pure stearylic alcohol | 0.5 |
| Glyceryl-12-trihydroxy-stearate | 0.5 |
| Glycerol trimontanate | 0.2 |
| Calcium montanate | 0.1 |
| SL 2016 | 0.1 |
| Stabilizer | 0.3 |

| Compound C | |
|---|---|
| Ingredients | Parts by weight |
| Polyvinyl chloride resin | 100 |
| Anti-shock resin | 12 |
| Epoxide soja bean oil | 3 |
| Chelating agent 1832 | 0.25 |

-continued

| | |
|---|---|
| Solution of potassium-2-ethyl-hexanoate containing 10% of potassium | 0.025 |
| Zinc calcium stearate | 0.2 |
| Calcium stearate | |
| Glyceryl-12-trihydroxy-stearate | 1 |
| Glycerol trimontanate | 0.3 |
| Acrylic resin | 0.5 |
| Stabilizer | 0.3 |

Compound D

| Ingredients | Parts by weight |
|---|---|
| Polyvinyl chloride resin | 90 |
| Vinyl chloride - vinylidene chloride co-polymer | 10 |
| Anti-shock resin | 7 |
| Acrylic resin | 2 |
| Epoxide soja bean oil | 0.5 |
| 3-(2'-Phenyl-phenyl)-1,2-epoxy-propane | 0.6 |
| Organostannic stabilizer | 0.5 |
| Calcium stearate | 0.2 |
| Hydrogenated rapseed oil | 0.5 |
| Methyl dihydroxy stearate | 0.2 |
| Micronized silica | 0.2 |
| Antioxydant | 0.1 |
| Stabilizer | 0.3 |

Compound E

| Ingredients | Parts by weight |
|---|---|
| Polyvinyl chloride resin | 100 |
| Anti-shock resin | 12 |
| Epoxide soja bean oil | 3 |
| Glyceryl-12-trihydroxy stearate | 1 |
| Glycerol trimontanate | 0.3 |
| Acrylic resin | 0.5 |
| Stabilizer | 1 |

The following ingredients are defined below:
SL 2016: solution of zinc-2-ethyl-hexanoate in a mixture of hydrocarbons boiling between 158° C and 184° C.
Chelating agent 1832: diphenyldecyl phosphite: 67 parts by weight solution of 10% zinc octoate in diisobutylic phthalate: 33 parts by weight.

a. Static thermostability.

The different Compounds were mixed and calendered in a mixer of which the cylinders were heated to 160° C. The rigid sheets so obtained were then heated in an oven to a temperature between 180° C and 215° C, until incipient carbonization.

A stove with rotating drums, ventilated and equipped with a thermostat was used for this operation. In the trials described hereunder, the behaviour of the sheets containing one of the stabilizers to be tested was compared to that of sheets of the same formulae but containing 2-phenylindole as stabilizer.

Comparison can be made by one of two methods, namely:

(1) The coloration of the sheets, of which samples were removed from the stove at fixed intervals, was compared to a standard scale of coloration, known as the GARDNER Scale and expressed in terms of the reference figures of the GARDNER Scale.

Comparisons were made with a GARDNER Scale comparator which contains 18 filters of coloured glass and which offers the possibility of observing by transparency and in a limited field of view both the sheet and the reference filters.

It may happen that the colour of the sheets is far removed from that of the GARDNER Scale, in which case comparison is difficult, if not impossible.

The following results were obtained:

2-(3'-Methoxy-4'-hydroxy-phenyl)-indole

Compound B was used and the sheets obtained presented the following characteristics:

| | |
|---|---|
| Initial thickness of the control sheet | 0.9 mm |
| Initial thickness of the test sheet | 1 mm |
| Temperature of the stove | 210° C |

| STABILIZERS | TIME IN MINUTES | | | | | | | |
|---|---|---|---|---|---|---|---|---|
| | 0 | 3 | 6 | 9 | 12 | 15 | 18 | 21 |
| 2-phenyl-indole | 1 | 1 | 2 | 3 | 4 | 7 | 9 | >18 |
| 2 | 1 | 1 | 2 | 3 | 4 | 6 | 9 | 11 |

The superiority of Stabilizer 2 over 2-phenyl-indole is evident after 21 minutes, since after this period of time the control sheet is completely burnt whereas the test sheet has a coloration of only 11° GARDNER.

2-(3'-Methoxy-4'-hydroxy-phenyl)-indole

Compound A was used.

| | |
|---|---|
| Initial thickness of the control sheet | 0.8 mm |
| Initial thickness of the test sheet | 0.9 mm |
| Temperature | 210° C |

| STABILIZERS | TIME IN MINUTES | | | | | | |
|---|---|---|---|---|---|---|---|
| | 0 | 3 | 6 | 9 | 12 | 15 | 18 |
| 2-phenyl-indole | 1 | 2 | 3 | 4 | 9 | 12 | 13 |
| 2 | 1 | 1 | 1.5 | 2 | 5 | 9 | 11 |

With Compound A, Stabilizer 2 was also found to be superior to 2-phenylindole.

2-(3'-Methoxy-4'-benzyloxy-phenyl)-indole

Compound A was used.

| | |
|---|---|
| Initial thickness of the control sheet | 0.9 mm |
| Initial thickness of the test sheet | 0.9 mm |
| Temperature | 185° C |

| STABILIZERS | TIME IN MINUTES | | | | | | | | | | |
|---|---|---|---|---|---|---|---|---|---|---|---|
| | 0 | 6 | 12 | 18 | 24 | 30 | 36 | 42 | 48 | 54 | 60 |
| 2-phenyl-indole | 1 | 2 | 4 | 9 | 11 | 15 | 15 | 16 | 16 | 18 | Burnt |
| 31 | 1 | 1 | 2 | 6 | 9 | 10 | 11 | 11 | 15 | 15 | Burnt |

(2) It is also possible to use a simplified method which is more rapid and with which valid results are also obtained: A reference scale is drawn up with sheets of thermally treated polyvinyl chloride, of which the colorations have been definitely determined in GARDNER degrees as above.

A GARDNER sub-scale is thus obtained in polyvinyl chloride sheets which can be directly compared to the sheets to be tested without using the comparator.

The following results were obtained with the said simplified method:

2-(3'-Methoxy-4'-hydroxy-phenyl)-indole

Compound C was used.
Temperature: 210° C

| STABILIZERS | TIME IN MINUTES | | | | | | | |
|---|---|---|---|---|---|---|---|---|
| | 0 | 10 | 20 | 30 | 40 | 50 | 55 | 60 |
| 2-phenyl-indole | 1 | 1.5 | 2 | <3 | 3 | >3 | 3.5 | >4 |

-continued

| STABILIZERS | TIME IN MINUTES | | | | | | | |
|---|---|---|---|---|---|---|---|---|
| | 0 | 10 | 20 | 30 | 40 | 50 | 55 | 60 |
| 2 | <1 | 1 | 1.5 | 2 | 2.5 | <3 | 3 | <4 |

The colorations are fairly far removed from the GARDNER Scale and the intensity of the colour is therefore difficult to appreciate. However, here also it can be seen that Stabilizer 2 is superior as a stabilizer to 2-phenyl-indole.

2-(3'-Methoxy-4'-hydroxy-phenyl)-indole

Compound D was used.
Temperature: 185° C

| STABILIZERS | TIME IN MINUTES | | | |
|---|---|---|---|---|
| | 0 | 10 | 20 | 30 |
| 2-phenyl-indole | 1 | 1 | <2 | 2 |
| 2 | <<1 | <1 | 1 | <<2 |

It is clear that Stabilizer 2 is in this case markedly superior to 2-phenyl-indole at 0, 10 and 20 minutes, principally with respect to the coloration given to the co-polymer.

2-(3',5'-Dimethoxy-phenyl)-indole

Compound A was used.
Temperature: 210° C

| STABILIZERS | TIME IN MINUTES | | | | | |
|---|---|---|---|---|---|---|
| | 0 | 3 | 6 | 9 | 12 | 15 |
| 2-phenyl-indole | 1 | 2 | 3 | 8 | 11 | 13 |
| 3 | 1 | 1 | 2 | 3 | 8 | 11 |

As early as the ninth minute, Stabilizer 3 showed itself to be markedly superior to 2-phenyl-indole. Moreover, the sheet containing 2-phenyl-indole was burnt along its edges after 15 minutes, whereas the test sheet was not.

2-(3'-Hydroxy-4'-methoxy-phenyl)-indole

Compound A was used.
Temperature: 210° C

| STABILIZERS | TIME IN MINUTES | | | | | | |
|---|---|---|---|---|---|---|---|
| | 0 | 3 | 6 | 9 | 12 | 15 | 18 |
| 2-phenyl-indole | 1 | 1 | 2 | 5 | 9 | 13 | Burnt |
| 13 | 1 | 1 | 1 | 4 | 7 | 10 | Burnt |

Stabilizer 13 is clearly superior to 2-phenyl-indole.

The results given in the following Table were obtained with Compound A at a temperature of 210° C

| STABILIZERS | TIME IN MINUTES | | | | | | |
|---|---|---|---|---|---|---|---|
| | 0 | 3 | 6 | 9 | 12 | 15 | 18 |
| 14 | 1 | 1 | 2 | 5 | 8 | 10 | 16 |
| 2-phenyl-indole | 1 | 1 | 2 | 9 | 11 | 13 | Burnt |
| 15 | 1 | 1 | 2 | 4 | 11 | 13 | Burnt |
| 2-phenyl-indole | 1 | 1 | 3 | 10 | 12 | 13 | Burnt |
| 16 | 1 | 1 | 2 | 3 | 9 | 13 | Burnt |
| 2-phenyl-indole | 1 | 1 | 3 | 4 | 12 | 14 | Burnt |
| 17 | 1 | 1 | 1 | 3 | 6 | 8 | 12 |
| 2-phenyl-indole | 1 | 1 | 1 | 4 | 10 | 12 | Burnt |
| 18 | 1 | 1 | 2 | 3 | 10 | 11 | 13 |
| 2-phenyl-indole | 1 | 1 | 2 | 8 | 9 | 10 | Burnt |
| 19 | 1 | 1 | 3 | 6 | 6 | 11 | 16 |
| 20 | 1 | 1 | 3 | 6 | 10 | 11 | Burnt |
| 2-phenyl-indole | 1 | 1 | 2 | 9 | 11 | 13 | Burnt |
| 23 | 1 | 1 | 2 | 2 | 3 | 9 | Burnt |
| 2-phenyl-indole | 1 | 1 | 3 | 10 | 12 | 13 | Burnt |
| 24 | 1 | 1 | 1 | 4 | 10 | 13 | Burnt |
| 29 | 1 | 1 | 1 | 4 | 10 | 13 | Burnt |
| 2-phenyl-indole | 1 | 1 | 3 | 6 | 14 | 134 | Burnt |
| 25 | 1 | 1 | 2 | 3 | 9 | 12 | Burnt |
| 28 | 1 | 1 | 2 | 2 | 10 | 13 | Burnt |
| 2-phenyl-indole | 1 | 1 | 3 | 4 | 12 | 14 | Burnt |
| 26 | 1 | 1 | 1 | 2 | 3 | 4 | 10 |
| 27 | 1 | 1 | 1 | 3 | 4 | 9 | 13 |
| 2-phenyl-indole | 1 | 1 | 1 | 4 | 10 | 12 | Burnt |
| 30 | 1 | 1 | 3 | 5 | 6 | 13 | Burnt |
| 32 | 1 | 1 | 4 | 4 | 11 | 13 | Burnt |
| 2-phenyl-indole | 1 | 1 | 3 | 5 | 6 | 13 | Burnt |
| 21 | 1 | 1 | 2 | 3 | 8 | 12 | 14 |
| 35 | 1 | 1 | 2 | 5 | 5 | 11 | 12 |
| 2-phenyl-indole | 1 | 1 | 2 | 8 | 9 | 10 | Burnt |
| 33 | 1 | 1 | 2 | 5 | 11 | 13 | Burnt |
| 34 | 1 | 1 | 2 | 5 | 10 | 13 | Burnt |
| 2-phenyl-indole | 1 | 1 | 3 | 11 | 13 | 14 | Burnt |
| 36 | 1 | 1 | 2 | 3 | 7 | 8 | — |
| 2-phenyl-indole | 1 | 1 | 2 | 3 | 9 | 11 | |
| 13 | | | | | | | |
| 37 | 1 | 1 | 2 | 2 | 8 | 10 | 12 |
| 2-phenyl-indole | 1 | 2 | 3 | 4 | 11 | 12 | Burnt |

(b) Dynamic thermostability.

The dynamic thermostability of resins containing respectively 2-(3'-methoxy-4'-hydroxy-phenyl)-indole and 2-phenyl-indole as stabilizers was compared by using the Compounds numbered hereunder:

No. 609: Compound C with 2-phenyl-indole as stabilizer
No. 676: Compound C with Stabilizer 2
No. 633: Compound E with 2-phenyl-indole as stabilizer
No. 674: Compound E with Stabilizer 2.

The tests were performed on a plastograph, working at a temperature of 190° C, turning at a speed of 60 r.p.m. and containing a charge of 30 g of gelled material.

Two curves were drawn namely:
- a decomposition curve giving the value of the resistant torque (m kg) in relation to time. From this curve, two important results were obtained: the minimal resistant torque and the time of decomposition.
- a curve giving the self-heating time in relation to temperature. The self-heating time is defined by the moment when the temperature of the sheet exceeds the temperature of the plastograph (190° C).

The results given in the following Table were obtained from these curves:

| MEASUREMENTS | COMPOUNDS | | | |
|---|---|---|---|---|
| | 609 | 676 | 633 | 674 |
| Minimal resistant torque in m kg | 1.1 | 1.1 | 0.96 | 0.95 |
| Decomposition time in min. | 23.5 | 23 | 43.5 | 44.5 |
| Self-heating time in min. | 6 | 8 | 9 | 22.5 |

Although the minimal resistant torques and the decomposition times are comparable, it should be emphasized that the sheets containing Stabilizer 2 present a better score with regard to self-heating time.

C. Sticking of the stabilized material.

Compounds Nos. 609 and 676 were placed in a mixer of the type previously used for studying static thermostability with cylinders at a fixed temperature of 210° C. They were submitted to alternate periods of 3 minutes of mixing and 3 minutes of rest.

Unlike Compound No. 609, Compound No. 674 did not stick to the cylinders after 19 minutes, which proves the superiority of the sheet containing Stabilizer 2 over the sheet containing 2-phenyl-indole with regard to sticking.

D. Behaviour on extrusion of the stabilized material.

Compounds Nos. 609 and 676 were extruded with an extruder fitted with a screw having a diameter of 45 mm. As opposed to Compound No. 609, Compound No. 676 was perfectly extruded.

E. Behaviour on blowing.

Bottles were moulded with Compounds Nos. 609, 674, 633 and 676 and it was observed that Compounds Nos. 674 and 676 gave bottles which were much more transparent than those obtained with Compounds Nos. 633 and 609.

In this test also, the superiority of Stabilizer 2 over 2-phenylindole was very marked.

F. Sublimation of the stabilizers of the invention.

It is well-known that 2-phenyl-indole presents the disadvantage of sublimating when being handled in the form of powder, during the formation of the Compound and during the extrusion of the latter. This relatively extensive sublimation constitutes a major disadvantage because in addition to the not inconsiderable loss of stabilizer, it causes pollution of the atmosphere in the workshops where the various operations are carried out.

The tendency to sublimate of 2-(3'-methoxy-4'-hydroxy-phenyl)-indole (Stabilizer 2) was compared to that of 2-phenyl-indole.

A sample of the substance to be tested was introduced into a test tube and heated under reduced pressure. The fraction of sublimated substance was recovered on a mobile cold wall.

After a certain period of time, the sublimated substance was weighed and the result expressed as a percentage of the weight of the starting material.

The results obtained can only be of relative value enabling a comparison to be made between two products tested under the same conditions.

Operating conditions (chosen at random)

| | |
|---|---|
| Temperature of heating | 120° C |
| Temperature of the cold wall | 13° C |
| Pressure | 15 Torr |
| Duration of heating | 150 minutes |
| Starting-weight | 150 mg |

The percentages of sublimated substance were respectively:
2-phenyl-indole: 26.9%
Stabilizer 2: 1.2%.

The ratio between the percentages of sublimation of Stabilizer 2 and 2-phenyl-indole shows that the sublimation of Stabilizer 2 is twenty times less than that of 2-phenyl-indole.

G. Thermostability of the stabilizers.

The thermostability of Stabilizer 2 and that of 2-phenyl-indole were studied by differential thermoanalysis and by thermogravimetric analysis.

(a) Differential thermoanalysis.

Differential thermoanalysis diagrams were drawn up by studying 2 mg samples of material placed in a non-airtight container, the rate of temperature increase being 2° C/minute and sensitivity 4 mcal/sec.

The diagrams were made out for 2-phenyl-indole (i) and Compound 2 (ii) and enabled the following conclusions to be drawn:

(i) 2-Phenyl-indole sublimates at 140° C and particularly from 185–190° C (melting point). There is no loss of water at 100° C. Decomposition appears to start at about 210°–220° C. It is very difficult to determine the decomposition temperature with accuracy because it is not possible to separate the effect of thermolysis from that of sublimation.

(ii) There is no loss of water; melting occurs at 160° C and decomposition starts at 235°–240° C, followed by a series of exothermic waves.

(b) Thermogravimetric analysis.

This analysis necessitated two series of trials carried out under air and under inert gas (argon) in order to eliminate any possible effect of oxygen. The results obtained were identical.

The temperature increase rate was 80°/hour.

Thermograms were drawn up under air for both 2-phenyl-indole (i) and for Stabilizer 2 (ii) and enabled the following conclusions to be drawn:

(i) Weight loss starts at about 190°–195° C. It is due to both sublimation and to incipient decomposition. In the case of the trial carried out under air, a yellowish residue was, in fact, obtained at 210° C which constitutes proof of decomposition. Although the sample was not kept at 210° C, it can be safely assumed that had this temperature been maintained for a prolonged period of time, at least in the presence of air, the sample would have undergone extensive degradation.

(ii) Loss of weight begins at about 235°–240° C, which corresponds to the beginning of decomposition.

The results of the thermogravimetric analysis confirm the results of the differential thermoanalysis, thus showing that Stabilizer 2 has greater thermostability than 2-phenyl-indole.

This fact is very important, since the preparation and processing of the resin often involve temperatures ranging from 180° C to 220° C, in some cases for several minutes.

H. Extractibility of the stabilizers.

The stabilizers according to the invention may be used to stabilize polymers which are intended for the manufacture of packaging and containers for food and drink and it was therefore necessary, in spite of their low toxicity, to determine their extractibility by solvents simulating food and drink.

This study was carried out in accordance with the requirements of the Food and Drug Administration (U.S.A).

The extractions were performed in semi-rigid bottles, prepared with Compounds Nos. 609 and 676, and with the following solvents: water, an aqueous solution of acetic acid (3%), ethanol-water 50/50, heptane.

The bottles had the following specifications:

| | |
|---|---|
| Diameter | 62 mm |
| Height | 170 mm |
| Capacity | 375 ml |
| Weight | 28 g |

The ratio of the volume of solvent to the surface of plastic material exposed to extraction was about 1 to 100 ml of solvent, taking into account the geometric characteristics of the bottles.

Operating conditions.

Temperature: 49° C

Heating: A thermostated oven for the non-inflammable solvents (water and acetic acid) A thermostated water-bath for the inflammable solvents (alcohol and heptane)

Duration of extraction: This is indicated under each result. They are, in each case, intentionally longer than those which would have given stable maximum values.

The quantity of stabilizer extracted was determined by colorimetric assay using p-dimethylaminobenzaldehyde, in accordance with the method described in Analytical Chemistry 36, 425–26 (1964).

A blank trial was carried out with a Compound of the same formula as Compounds Nos. 609 and 676, but without any stabilizer. A purely negative result was obtained. All the results are given in the Tables hereunder. The amounts of stabilizer assayed are expressed in µg per liter of extraction solvent or, which is the same per 1000 cm² of surface submitted to extraction.

| | COMPOUNDS | |
|---|---|---|
| SOLVENTS | No. 609 | No. 676 |
| Water | 40 (6 days) | <3 (10 days) |
| 3% Aqueous solution of acetic acid | <3 (20 days) | <3 (20 days) |
| Aqueous ethanol 50/50 | 100 (9 days) | <10 (9 days) |
| Heptane | 875 (48 hours) | 175 (48 hours) |

Other trials were carried out with Compound A containing the different Stabilizers listed below and the following results were obtained:

| | STABILIZERS | | | |
|---|---|---|---|---|
| SOLVENTS | 14 | 19 | 24 | 30 |
| Water | 23 (10 days) | <3 (10 days) | <3 (10 days) | <3 (10 days) |
| 3% Aqueous solution of acetic acid | <3 (20 days) | <3 (20 days) | <3 (20 days) | <3 (20 days) |
| Aqueous ethanol 50/50 | <10 (9 days) | <10 (9 days) | <10 (9 days) | <10 (9 days) |
| Heptane | 175 (48 hours) | 175 (48 hours) | 175 (48 hours) | 175 (48 hours) |

These results show that Stabilizers 2, 14, 19, 24 and 30 are markedly less extractible than 2-phenyl-indole with regard to water, aqueous ethanol and heptane.

In the case of diluted acetic acid, the amounts extracted are approximately the same, but it is difficult to draw a conclusion because these amounts are below the sensitivity threshold of the method assay.

With regard to water, it is clear that Stabilizer 2 is markedly superior to 2-phenyl-indole since its extractibility is at least 10 times less than that of the latter. This finding is important because it is closely related to the problem of providing containers for mineral waters and the possible pollution of the latter by the recipient in stabilized polymer.

The Stabilizers covered by the invention are introduced into the thermoplastic material in the proportion of 0.1% to 1% by weight.

The following Examples provide a non-limitative illustration of the processes of preparation of the substances covered by the invention:

EXAMPLE 1

2-(2'-Hydroxy-4'-methoxy-phenyl)-indole.

a. Preparation of 2-hydroxy-4-methoxy-acetophenone-phenylhydrazone.

Into a solution of benzene containing 166 g (1 mol) of 2-hydroxy-4-methoxy-acetophenone were introduced 94 g (1 mol) of phenylhydrazine and a catalytic quantity of acetic anhydride and the mixture was refluxed for one hour. The solvent was then evaporated off and the crude 2-hydroxy-4-methoxy-acetophenone-phenylhydrazone obtained was directly used for the following step.

By the procedure described above but using the appropriate starting-products, the compounds listed hereunder were prepared:

2-hydroxy-5-methyl-acetophenone-phenylhydrazone
2-methyl-4-methoxy-acetophenone-phenylhydrazone
2-hydroxy-4-methyl-acetophenone-phenylhydrazone
3-methyl-4-methoxy-acetophenone-phenylhydrazone
2,4-dimethoxy-acetophenone-phenylhydrazone
3-n-dodecyl-4-methoxy-acetophenone-phenylhydrazone
3-isopropyl-4-methoxy-acetophenone-phenylhydrazone
3-cyclohexyl-3-methoxy-acetophenone-phenylhydrazone
3,5-dimethyl-4-methoxy-acetophenone-phenylhydrazone
3,5-dimethyl-4-ethoxy-acetophenone-phenylhydrazone b. Preparation of 2-(2'-hydroxy-4'-methoxy-phenyl)-indole.

To 450 g of a mixture of orthophosphoric acid/phosphoric anhydride (1/1), heated to a temperature between 140° C and 180° C, were slowly added 230 g (1 mol) of 2-hydroxy-4-methoxy-acetophenone-phenylhydrazone, the temperature being maintained at the same level for 1 hour.

The reaction medium as poured into one liter of water and the substance which precipitated was taken up in ether. The ethereal phase was washed with water until neutrality and dried.

After purification of the solution with active charcoal and evaporation of the ether, a greenish oil was obtained which crystallized to provide the crude product.

After recrystallization from benzene, 60 g of 2-(2'-hydroxy-4'-methoxyphenyl)-indole were obtained. M.P.: 195° C. Yield: 25%.

By the same procedure but using the appropriate starting-products, the compounds listed hereunder were prepared:

| Compound | Melting Point |
|---|---|
| 2-(2'-hydroxy-5'-methyl-phenyl)-indole | 178° C |
| 2-(2'-hydroxy-4'-methyl-phenyl)-indole | 191° C |
| 2-(3'-methyl-4'methoxy-phenyl)-indole | 210° C |
| 2-(2',4'-dimethoxy-phenyl)-indole | 143° C |

EXAMPLE 2

2-(2'-Methyl-4'-methoxy-phenyl)-indole.

By the procedure in Example 1, but operating at a temperature of about 110° C–120° C and starting from 2-methyl-4-methoxy-acetophenone-phenylhydrazone, 95 g of 2-(2'-methyl-4'-methoxy-phenyl)-indole were obtained after recrystallization from ethanol. M.P. : 131° C. Yield : 40%.

EXAMPLE 3

2-(3'-n-Dodecyl-4'-methoxy-phenyl)-indole.

A quantity of 50 g of polyphosphoric acid was prepared by mixing one part of orthophosphoric acid with one part of phosphoric anhydride and the mixture was heated to 100° C. To this mixture were slowly added 40.8 g (0.1 mol) of 3-n-dodecyl-4-methoxy-acetophenone-phenylhydrazone, prepared as described in Example 1 and the reaction medium was maintained at about 100 to 110° C for 1 hour. After cooling to 80° C, the mixture was poured into iced water and the indolic precipitate which formed was filtered out and washed with water until neutrality, dried and washed with hexane.

After recrystallization from ethanol under nitrogen atmosphere, 9 g of 2-(3'-n-dodecyl-4'-methoxy-phenyl)-indole were obtained. M.P. : 111° C. Yield : 23%.

By the same method but using the appropriate starting-products, the following compounds were prepared:

| Compound | Melting Point |
| --- | --- |
| 2-(3'-isopropyl-4'-methoxy-phenyl)-indole | 160° C (Benzene, then ethanol) |
| 2-(3'-cyclohexyl-4'-methoxy-phenyl)-indole | 176° C (Benzene) |
| 2-(3',5'-dimethyl-4'-methoxy-phenyl)-indole | 175° C (Ethanol, then acetone) |
| 2-(3',5'-dimethyl-4'-ethoxy-phenyl)-indole | 134° C (Chromatography on a silica column with benzene as eluant) |

EXAMPLE 4

2-(3'-Methoxy-4'-hydroxy-phenyl)-indole.

a. Preparation of 3-methoxy-4-hydroxy-acetophenone-phenylhydrazone.

A mixture comprising 8.3 g (0.05 mol) of 3-methoxy-4-hydroxy-acetophenone. 5.4 g (0.05 mol) of phenylhydrazine, 20 ml of ethanol and a drop of acetic acid was refluxed for 6 hours and then maintained at a temperature of about 5° C for one night.

The substance which precipitated was centrifuged, washed with a minimum of benzene and dried under vacuum at room temperature to give 10.5 g of 3-methoxy-4-hydroxy-acetophenone-phenylhydrazone. M.P.: 131° C. Yield: 82%.

b. Preparation of 2-(3'-methoxy-4'-hydroxy-phenyl)-indole.

40 g of orthophosphoric acid was poured onto 7.68 g (0.03 mol) of 3 -methoxy-4-hydroxy-acetophenone-phenylhydrazone and the mixture was heated to 130° C for one hour and then to 180° C for ten minutes. After being allowed to stand for 30 minutes at room temperature, the reaction medium was taken up in 200 ml of water and the aqueous solution was extracted several times with methylene chloride. The collected organic phases were washed with water, dried over anhydrous magnesium sulphate and then filtered through an alumina column.

The solution was evaporated to dryness and 5.1 g of crude product were obtained. After two recrystallizations from toluene, 4.8 g of 2-(3'-methoxy-4'-hydroxy-phenyl)-indole were obtained. M.P.: 165° C. Yield: 67.3%.

EXAMPLE 5

2-(3',4'-Dimethoxy-phenyl)-indole.

a. Preparation of 3,4-dimethoxy-acetophenone-phenylhydrazone.

A mixture of 60 g (0.3 mol) of 3,4-dimethoxy-acetophenone, 33 ml of phenylhydrazine, 100 ml of ethanol and 1.5 ml of acetic acid was refluxed under nitrogen for 10 hours.

The alcohol was evaporated off and the residue was recrystallized from toluene, to give 56.8 g of crystals. By concentrating the mother-liquors, 28.2 g of crude product were also recovered which were added to the 56.8 g of crystals already obtained.

The 85 g of crude 3,4-dimethoxy-acetophenone-phenylhydrazone so obtained was directly engaged in the following step.

By the procedure described above but using the appropriate starting-products, the compounds given hereunder were prepared:
3,5-dimethoxy-acetophenone-phenylhydrazone.
3,4,5-trimethoxy-acetophenone-phenylhydrazone.

b. Preparation of 2-(3',4'-dimethoxy-phenyl)-indole.

While stirring and maintaining the temperature at about 170° C-185° C, 67.5 g (0.25 mol) of 3,4-dimethoxy-acetophenone-phenylhydrazone were added to 450 g of polyphosphoric acid prepared as in Example 1.

The temperature was then maintained at 180° C for 10 minutes and the mixture was allowed to stand for 10 minutes at room temperature.

The reaction medium was taken up in one liter of water and stirred until disappearance of the oily phase. After cooling to room temperature, the aqueous suspension was extracted several times with ether and the collected ethereal phases were washed with water, dried over anhydrous sodium sulphate and filtered through a neutral alumina column. After recrystallizaton from toluene, 22 g of 2-(3',4'-dimethoxy-phenyl)-indole were obtained. M.P.: : 188° C. Yield: 35%.

By the procedure described above but using the appropriate starting-products, the following compounds were prepared:

| Compound | Melting Point |
| --- | --- |
| 2-(3',5'-dimethoxy-phenyl)-indole | 124° C |

EXAMPLE 6

2-(3'-Hydroxy-4'-methoxy-phenyl)-indole.

a. Preparation of 3-hydroxy-4-methoxy-acetophenone-phenylhydrazone.

While stirring, a solution of 500 ml of benzene containing 60 mol) (0.36 mol) of 3-hydroxy-4-methoxy-acetophenone, 20 g (0.2 mol) of phenylhydrazine and 5 ml of acetic anhydride was refluxed for one hour. The benzene solution was concentrated by evaporation under reduced pressure to give crude 3-hydroxy-4-methoxy-acetophenone-phenylhydrazone, which was directly engaged in the following step.

b. Preparation of 2-(3'-hydroxy-4'-methoxy-phenyl)-indole. precipitate

In 20 minutes, 20 g (0.12 mol) of 3-hydroxy-4-methoxy-acetophenone-phenylhydrazone were added to 100 g of a mixture of phosphoric acid/phosphoric anhydride (60/40) and the reaction medium was heated to 110° C for 30 minutes after the end of the operation of addition. The mixture was poured into iced-water and the indolic derivative was extracted with ether.

The ethereal phase was washed, dried and concentrated under reduced pressure. The crude product which was obtained was recrystallized from a mixture of toluene-ethanol (80/20) and 14.3 g of 2-(3'-hydroxy-4'-methoxy-phenyl)-indole were obtained. M.P.: 217° C. Yield: 50%.

EXAMPLE 7

2-(2',4'-Dihydroxy-phenyl)-indole.

a. Preparation of 2,4-dihydroxy-acetophenone-phenylhydrazone.

A mixture of 15.2 g (0.1 mol) of 2,4-dihydroxy-acetophenone, 50 ml of ethanol, 10 ml of phenylhydrazine and 3 drops of acetic acid was refluxed for 2 hours and then allowed to stand in an ice-bath for 30 minutes. The crystals obtained were centrifuged and washed with 100 ml of hexane to give 21 g of 2',4'-dihydroxy-acetophenone-phenylhydrazone in the form of brown crystals. M.P.: 159° C.

b. Preparation of 2-(2',4'-dihydroxy-phenyl)-indole.

To 60 g of orthophosphoric acid were added 12.2 g (0.05 mol) of 2,4-dihydroxy-acetophenone-phenylhydrazone and the reaction medium was heated to 130° C for 1 hour, then to 180° C for 10 minutes. While stirring, the mixture was poured into one liter of ice-water and was extracted with ethyl acetate. The organic phase was washed with 100 ml of water, dried and the solvent was evaporated off. The residue was chromatographed on a silica column, with a mixture of ethyl acetate/ether (10/90) as eluant. The solvent was eliminated and the residue was recrystallized from a mixture of toluene-methanol to give 4.60 g of 2-(2',4'dihydroxy-phenyl)-indole. M.P.: 188° C. Yield: 40%.

EXAMPLE 8

2-(3'-methoxy-4'-hydroxy-phenyl)-indole.

Over a period of 15 minutes, 20 g (0.1 mol) of ω-chloro-3-methoxy-4-hydroxy-acetophenone were added to 32.5 g (0.35 mol) of boiling aniline and the temperature was maintained at 180° C for 20 minutes.

The mixture was then poured into a diluted aqueous solution of hydrochloric acid and the indolic derivative was extracted with ether. The ethereal phase was washed, dried and concentrated under reduced pressure. The crude product was moistened with toluene and centrifuged.

After recrystallization from a mixture of toluene-ethanol (80/20) 4.8 g of 2-(3'-methoxy-4'-hydroxy-phenyl)-indole were obtained. M.P.: 165° C. Yield: 20%.

By the same method but using the appropriate starting-product the following compound was prepared:

| Compound | Melting Point |
| --- | --- |
| 2-(3'-isopropyl-4'-methoxy-phenyl)-indole | 160° C |

EXAMPLE 9

2-(3',4'-dimethoxy-phenyl)-indole.

A mixture of 372 g (4 mols) of aniline and 215 g (1 mol) of ω-chloro-3,4-dimethoxy-acetophenone was refluxed for one hour. The reaction medium was cooled to about 50° C and poured into iced-water to which 50 ml of concentrated hydrochloric acid had been added. The reaction medium was extracted with chloroform and the organic phase was washed with water, dried and concentrated under reduced pressure.

After recrystallization from ethanol, 100 g of 2-(3',4'-dimethoxy-phenyl)-indole were obtained. M.P.: 190°-192° C. Yield: 40%.

EXAMPLE 10

2-(2'-methoxy-5'-methyl-phenyl)-indole.

To a solution of 223 g (1 mol) of 2-(2'-hydroxy-5'-methyl-phenyl)-indole, prepared as in Example 1, in 1200 ml of N,N-dimethylformamide, were added at a temperature of 90° C 65 g (1.2 mol) of sodium methylate and then, drop-by-drop, 170 g (1.2 mol) of methyl iodide.

After the end of the operation of addition, the mixture was heated to 100° C for 3 hours. The reaction medium was allowed to cool and the crude product was precipitated by adding water. The precipitate was taken up in ether, washed and dried. The ether was evaporated off and the product was purified by chromatography on a silica column, with benzene as eluant to give 150 g of 2-(2'-methoxy-5'-methyl-phenyl)-indole. M.P.: 119° C. Yield: 59%.

EXAMPLE 11

2-(2'-Methoxy-4'methyl-phenyl)-indole.

At a temperature of 25° C. 54 g (1 mol) of sodium methylate and 170 g (1.2 mol) of methyl iodide were added to a solution of 223 g (1 mol) of 2-(2'-hydroxy-4'-methyl-phenyl)-indole, prepared as in Example 1, in 1200 ml of N,N-dimethylformamide. The solution was then stirred for 2 hours and the crude product was precipitated by adding water. After recrystallization from benzene, 166 g of 2-(2'-methoxy-4'-methyl-phenyl)-indole were obtained. M.P.: 125° C. Yield: 70%.

EXAMPLE 12

2-(3'-Methoxy-4'-ethoxy-phenyl)-indole.

To a mixture of 50 ml of N,N-dimethylformamide and 1.23 g (0.022 mol) of potassium hydroxide, were added 4.8 g (0.02 mol) of 2-(3'-methoxy-4'-hydroxy-phenyl)-indole, prepared as described in Example 4, and the reaction medium was heated to a temperature of 50° C. Over a period of 10 minutes, 4.68 g (0.03 mol) of ethyl iodide were added and the whole was heated to 60° C for two hours. After cooling, the reaction medium was poured into water and extracted with ether. The ethereal phase was washed with water until neutrality, dried and concentrated under reduced pressure.

After recrystallization from toluene, 3.06 g of 2-(3'-methoxy-4'-ethoxy-phenyl)-indole were obtained. M.P.: 177° C. Yield: 60%.

EXAMPLE 13

2-(3'-Methoxy-4'-n-dodecyloxy-phenyl)-indole.

Over a period of 15 minutes, 23.9 g (0.1 mole) of 2-(3'-methoxy-4'-hydroxy-phenyl)-indole, prepared as described in Example 8, were added to a mixture of 120 ml of N,N-dimethylformamide and 6.75 g (0.125 mol) of sodium methylate. The mixture was stirred for 15 minutes after which 25.6 g (0.1 mol) of 1-chloro-dodecane were added over a period of 15 minutes. The reaction medium was then heated to a temperature of 130° C and was stirred at this temperature for 3 hours. After cooling, the reaction medium was poured into water and the pecipitate which formed was filtered out and washed with water until neutrality.

After two successive recrystallizations in ethanol, 20 g of 2-(3'-methoxy-4'-n-dodecyloxy-phenyl)-indole were obtained. M.P.: 104° C. Yield: 50%.

By following the same procedure but using the appropriate starting-products, the following compounds were prepared:

| Compound | Melting Point |
| --- | --- |
| 2-(3'methoxy-4'-n-butyloxy-phenyl)-indole | 140° C (Ethanol) |
| 2-(3'methoxy-4'-n-propyloxy-phenyl)-indole | 138° C (Ethanol, then acetone) |
| 2-(3'methoxy-4'-isopropyloxy-phenyl)-indole | 139° C (Ethanol, then acetone) |
| 2-(3',4'-diethoxy-phenyl)-indole | 163° C (Benzene, then ethanol) |
| 2-(3'-benzyloxy-4'-methoxy-phenyl)-indole | 174° C (Ethanol) |
| 2-(3'-methyl-4'-n-dodecyloxy-phenyl)-indole | 112° C (Hexane) |
| 2-(3'-methyl-4'-benzyloxy-phenyl)-indole | 184° C (Ethanol, then acetone) |
| 2-(3'-methoxy-4'-benzyloxy-phenyl)-indole | 157° C (Toluene) |
| 2-(3',4'-methylenedioxy-phenyl)-indole | 191° C (Methanol) |
| 2-(3',4'-ethylenedioxy-phenyl)-indole | 190° C (Methanol) |

EXAMPLE 14

2-(2'-Methyl-4'-hydroxy-phenyl)-indole.

A solution of 1800 ml of benzene containing 237 g (1 mol) of 2-(2'-methyl-4'-methoxy-phenyl)-indole, prepared as in Example 2 and 300 g (2.25 mols) of chloride was refluxed for 2 hours. The reaction medium was cooled and extracted with ether. The ethereal phase was washed until neutrality and dried over anhydrous sodium sulphate.

The ether was evaporated off and, after recrystallization from benzene, 167 g of 2-(2'-methyl-4'-hydroxy-phenyl)-indole were obtained. M.P.: 106° C. Yield : 75%.

By the above procedure but using the appropriate starting-products, the following compounds were prepared:

| Compound | Melting Point |
| --- | --- |
| 2-(3'-methyl-4'-hydroxy-phenyl)-indole | 222° C (Recrystallization from ethanol-water 95/5) |
| 2-(3'-n-dodecyl-4'-hydroxy-phenyl)-indole | 115° C (Benzene) |
| 2-(3'-isopropyl-4'-hydroxy-phenyl)-indole | 195° C (Benzene) |
| 2-(3',4'-dihydroxy-phenyl)-indole | 236° C (Methanol) |
| 2-(3'-cyclohexyl-4'-hydroxy-phenyl)-indole | 161° C (Benzene/heptane) |
| 2-(3',5'-dimethyl-4'-hydroxy-phenyl)-indole | 254° C (Ethanol) |

We claim:

1. Compositions comprising homopolymers and copolymers of vinyl chloride containing a stabilizing amount of at least one stabilizer of the formula

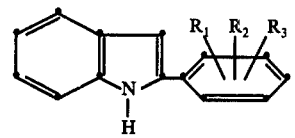     I wherein $R_1$ and $R_2$, which are the same or different, each represent a branched- or straight-chain alkyloxy group containing from 1 to 12 carbon atoms, a benzyloxy radical, a hydroxy radical or $R_1$ and $R_2$ represent together an alkylenedioxy radical containing from 1 to 3 carbon atoms, $R_3$ represents a hydrogen atom, a methyl or methoxy radical.

2. Compositions as claimed in claim 1 which contain the said stabilizer in a proportion of 0.1% to 1% by weight.

3. Alcohols made from the compositions as claimed in claim 1 which are useful for the manufacture of packaging and containers for food and drink.

* * * * *

UNITED STATES PATENT OFFICE
CERTIFICATE OF CORRECTION

Patent No. 4,096,112     Dated  June 20, 1978

Inventor(s)  Charles Pigerol et al.

It is certified that error appears in the above-identified patent and that said Letters Patent are hereby corrected as shown below:

First page, first column, below item [22], the following is inserted:

--[30] Foreign Application Priority Data
    June 5, 1974 [FR] France......74 19304--;

Column 18, line 48, "Alcohols" should read --Articles--.

Signed and Sealed this

Nineteenth Day of December 1978

[SEAL]

Attest:

RUTH C. MASON
*Attesting Officer*

DONALD W. BANNER
*Commissioner of Patents and Trademarks*